(12) United States Patent
Ishioka et al.

(10) Patent No.: US 12,246,642 B2
(45) Date of Patent: Mar. 11, 2025

(54) VEHICULAR FRONT STRUCTURE

(71) Applicant: TOYOTA JIDOSHA KABUSHIKI KAISHA, Toyota (JP)

(72) Inventors: Hirotaka Ishioka, Toyota (JP); Hideo Takeda, Hekinan (JP); Norimasa Koreishi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/124,204

(22) Filed: Mar. 21, 2023

(65) Prior Publication Data
US 2023/0302989 A1 Sep. 28, 2023

(30) Foreign Application Priority Data

Mar. 23, 2022 (JP) .................. 2022-046827

(51) Int. Cl.
 *B60Q 1/26* (2006.01)
 *B60Q 1/50* (2006.01)
 *B62D 21/15* (2006.01)
 *B62D 25/04* (2006.01)

(52) U.S. Cl.
CPC ........... *B60Q 1/5035* (2022.05); *B60Q 1/543* (2022.05); *B62D 21/152* (2013.01); *B62D 25/04* (2013.01)

(58) Field of Classification Search
CPC ...... B60Q 1/5035; B60Q 1/543; B60Q 1/507; B60Q 1/547; B60Q 1/503; B62D 21/152; B62D 25/04; B62D 33/06; B62D 25/08
See application file for complete search history.

(56) References Cited

U.S. PATENT DOCUMENTS

| | | | |
|---|---|---|---|
| 2005/0077711 A1* | 4/2005 | Yasui | B62D 25/04 296/193.09 |
| 2020/0290680 A1* | 9/2020 | Tahara | B62D 25/08 |
| 2020/0413519 A1 | 12/2020 | Shitara et al. | |
| 2021/0114513 A1 | 4/2021 | Morimura | |
| 2021/0387569 A1 | 12/2021 | Morimura | |
| 2022/0001794 A1 | 1/2022 | Morimura | |
| 2022/0009411 A1 | 1/2022 | Morimura | |
| 2022/0063509 A1* | 3/2022 | Matori | G01S 17/42 |

FOREIGN PATENT DOCUMENTS

| | | |
|---|---|---|
| JP | 2003-300481 A | 10/2003 |
| JP | 2021-008135 A | 1/2021 |
| JP | 2021-064256 A | 4/2021 |

* cited by examiner

*Primary Examiner* — Toan N Pham
(74) *Attorney, Agent, or Firm* — Dinsmore & Shohl LLP

(57) ABSTRACT

A vehicular front structure includes: a left front pillar disposed at a left front face of a body of a vehicle; a right front pillar disposed at a right front face of the body; an upper front crossing member extending along a lateral direction of the vehicle, the upper front crossing member having respective ends coupled one-to-one with the left front pillar and the right front pillar; a lower front crossing member extending along the lateral direction of the vehicle, the lower front crossing member having respective ends coupled one-to-one with the left front pillar and the right front pillar; and an external display coupled with the upper front crossing member and the lower front crossing member.

14 Claims, 5 Drawing Sheets

VEHICULAR FRONT STRUCTURE

CROSS REFERENCE TO RELATED APPLICATION

This application claims priority to Japanese Patent Application No. 2022-046827 filed on Mar. 23, 2022 which is incorporated herein by reference in its entirety including the specification, claims, drawings, and abstract.

TECHNICAL FIELD

The present disclosure relates to a vehicular front structure and particularly relates to a structure for an improvement in the strength of the body of a vehicle.

BACKGROUND

A typical passenger car includes an independent motor compartment located forward of a cabin. At the time of frontal collision, a structure defining the motor compartment is crushed, so that the impact of collision is absorbed. Meanwhile, a vehicle in which a motor compartment is not provided independently forward of a cabin, such as a vehicle having a boxy body, has no adequate space for an impact-absorbing structure. JP 2021-8135 A discloses a vehicle (10) having a boxy body (body 12) having a front face provided with an external display device (character display device 22). Note that the member names and reference numerals in the above brackets are used in JP 2021-8135 A and thus are not related to the member names and reference numerals in an embodiment in the present specification.

SUMMARY

A vehicle having a front portion not provided with an independent motor compartment, such as a boxy vehicle, requires a high-strength vehicular front structure that receives an impact in the event of a frontal collision.

According to the present disclosure, there is provided a vehicular front structure including: a left front pillar disposed at a left front face of a body of a vehicle; a right front pillar disposed at a right front face of the body; an upper front crossing member extending in a left-right direction of the vehicle, the upper front crossing member having respective ends coupled one-to-one with the left front pillar and the right front pillar; a lower front crossing member extending in the left-right direction of the vehicle, the lower front crossing member having respective ends coupled one-to-one with the left front pillar and the right front pillar, the lower front crossing member being disposed below the upper front crossing member; and an external display coupled with the upper front crossing member and the lower front crossing member.

The external display is coupled with the upper front crossing member and the lower front crossing member, so that the external display serves as a member contributing to the strength of the body, leading to an improvement in the strength of the vehicular front structure.

The external display can have a left end edge and a right end edge coupled with the upper front crossing member and the lower front crossing member. The external display has two parts coupled with the upper front crossing member and the lower front crossing member, leading to a further improvement in the strength of the front face of the body.

The external display can include: a display panel; a display case supporting the display panel, the display case housing a display drive device that drives the display panel; a left display bracket disposed along a left edge of the display case, the left display bracket being coupled with the left edge; and a right display bracket disposed along a right edge of the display case, the right display bracket being coupled with the right edge. Each of the left display bracket and the right display bracket has an upper end portion and a lower end portion coupled, respectively, with the upper front crossing member and the lower front crossing member.

The external display serves as a member contributing to the strength of the body, leading to an improvement in the strength of the vehicular front structure.

DESCRIPTION OF EMBODIMENTS

An embodiment of the present disclosure will be described below with reference to the drawings. In the following description, unless otherwise specified, relative positional, directional, and orientational terms, such as front, ahead of, rear, behind, left, leftward, right, rightward, up, above, down, and below, indicate the position, direction, and orientation based on a vehicle. The front-rear direction, left-right direction, and up-down direction of the vehicle are defined, respectively, as a longitudinal direction, a lateral direction, and a vertical direction.

Figure 1:
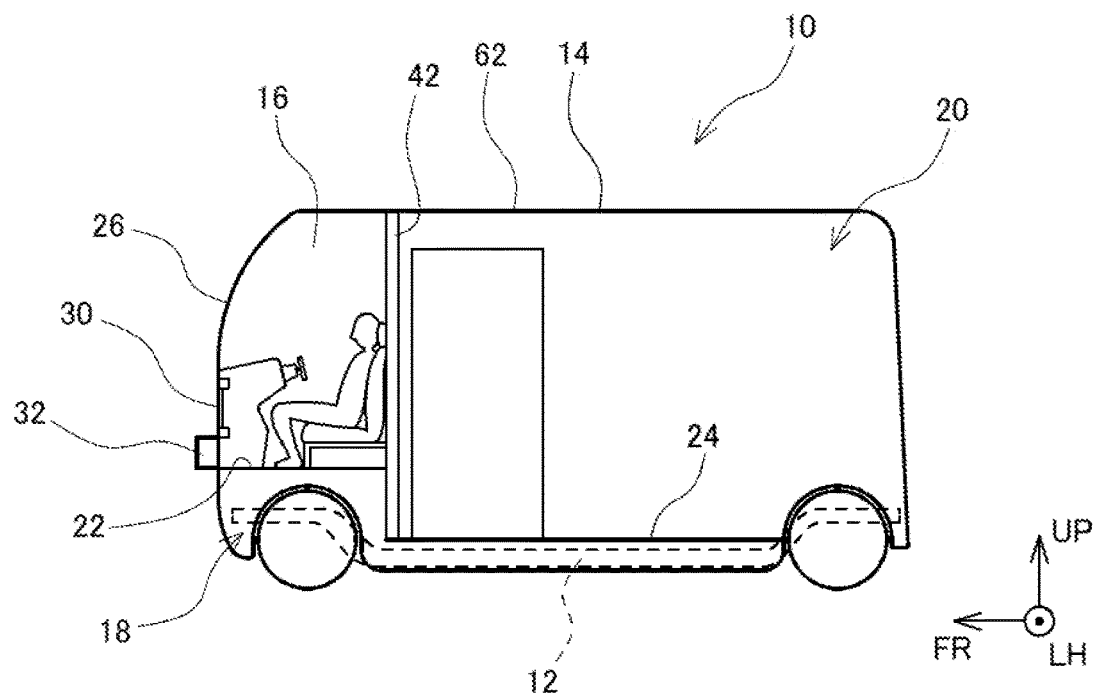
FIG. 1 is a schematic side view of a schematic configuration of a vehicle according to the present embodiment.

FIG. 1 is a schematic view of the configuration of main components of a vehicle 10. The vehicle 10 has a structure in which a body 14 is mounted on a ladder frame 12. The vehicle 10 includes a driver's cab 16 and a motor compartment 18 disposed at its front end portion, in which the motor compartment 18 is located below the driver's cab 16. Thus, the vehicle 10 serves as a so-called cabover vehicle. The motor compartment 18 houses an electric motor (not illustrated) as an exemplary motor that drives the vehicle. A passenger cabin 20 that passengers board is disposed behind the driver's cab 16. A driver's-cab floor 22 of the driver's cab 16 is located higher than a passenger-cabin floor 24 of the passenger cabin 20.

Figure 2:
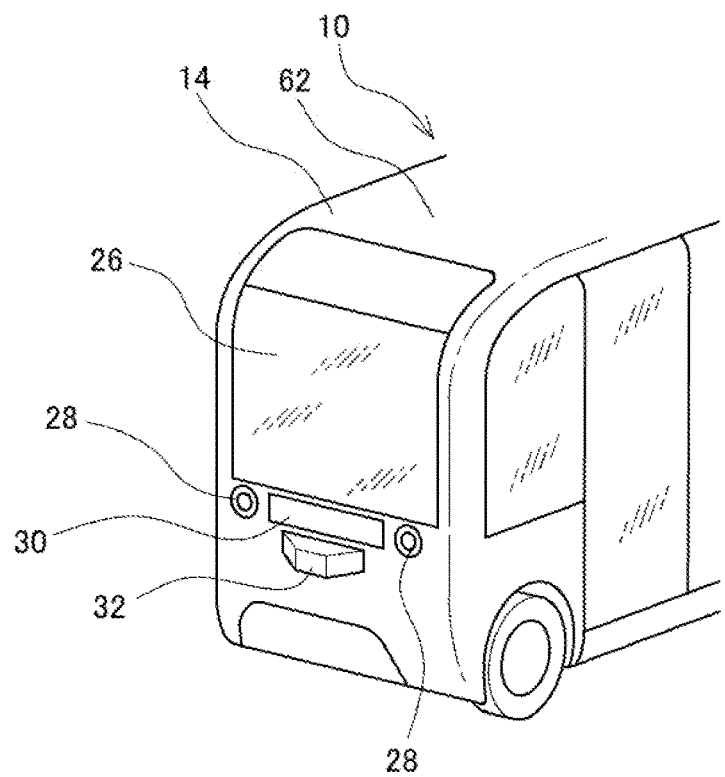
FIG. 2 is a schematic perspective view of the configuration of the front face of the vehicle according to the present embodiment.

FIG. 2 illustrates the front face of the vehicle 10. A headlight 28 is disposed on the left below a windshield 26 and another headlight 28 is disposed on the right below the windshield 26. In addition, an external display 30 is disposed between the headlights 28. The external display 30 provides external objects, such as pedestrians and oncoming vehicles, with information regarding the situation of the vehicle 10. For example, the external display 30 displays a message prompting a pedestrian who is trying to cross the road to cross or displays, if the vehicle 10 serves as a route bus, the destination. If the vehicle 10 is capable of automated driving, the external display 30 displays "under automated driving" or "under unautomated driving."

In addition, for example, below the external display 30 on the front face of the vehicle 10, a sensor unit 32 is disposed in order to acquire an external situation. The external situation acquired by the sensor unit 32 is used as information for driving assistance or automated driving. The sensor unit 32 may include a light detection and ranging (LiDAR) device that measures the distance to a target around the vehicle.

Figure 3:
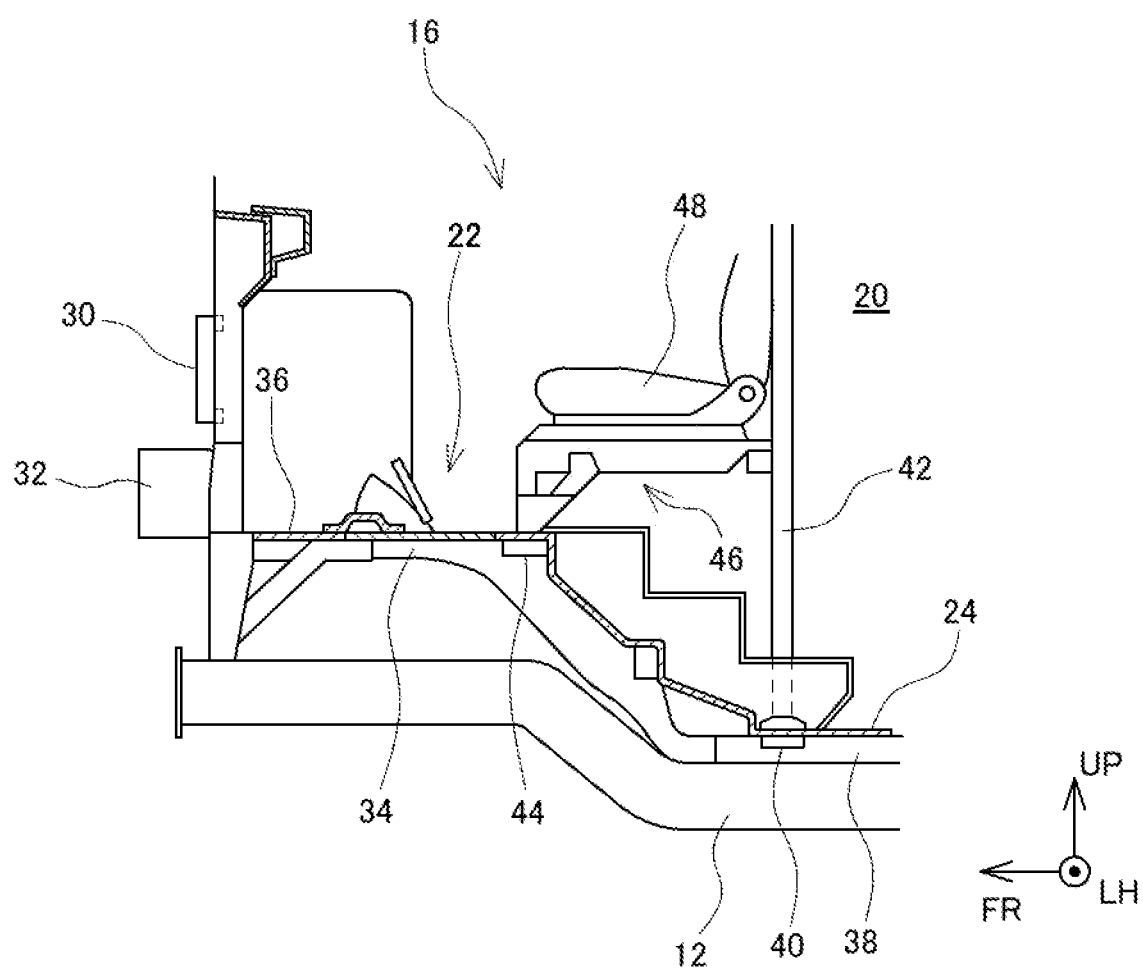
FIG. 3 is a schematic side view of the configuration of a driver's cab.

FIG. 3 is a schematic side view of a schematic structure of the driver's cab 16. The body 14 mounted on the ladder frame 12 includes front side members 34 as frame members that are disposed one-to-one on the left and right of the front portion of the body 14 and extend in the longitudinal direction. Each of the front side members 34 has a front portion supporting the floor panel 36 of the driver's-cab floor 22 and has a rear portion inclining rearward and downward and having a rear end coupled with a center side member 38 supporting the passenger-cabin floor 24. A frame structure includes a passenger-cabin crossing member 40 extending in the lateral direction along the front edge of the passenger-cabin floor 24. The passenger-cabin crossing member 40 intersects and is coupled with the center side members 38. A plurality of supports 42 are arrayed along the direction in which the passenger-cabin crossing member 40 extends, and stand on the passenger-cabin crossing member 40. A partition board may be attached to the supports 42 such that a partition wall is formed between the driver's cab 16 and the passenger cabin 20. The frame structure further includes a driver's-cab crossing member 44 extending in the lateral direction along the rear edge of the driver's-cab floor 22. The driver's-cab crossing member 44 intersects and is coupled with the front side members 34. The supports 42 and the driver's-cab crossing member 44 support a seat base 46. A driver's seat 48 is placed and fixed on the seat base 46.

Figure 4:
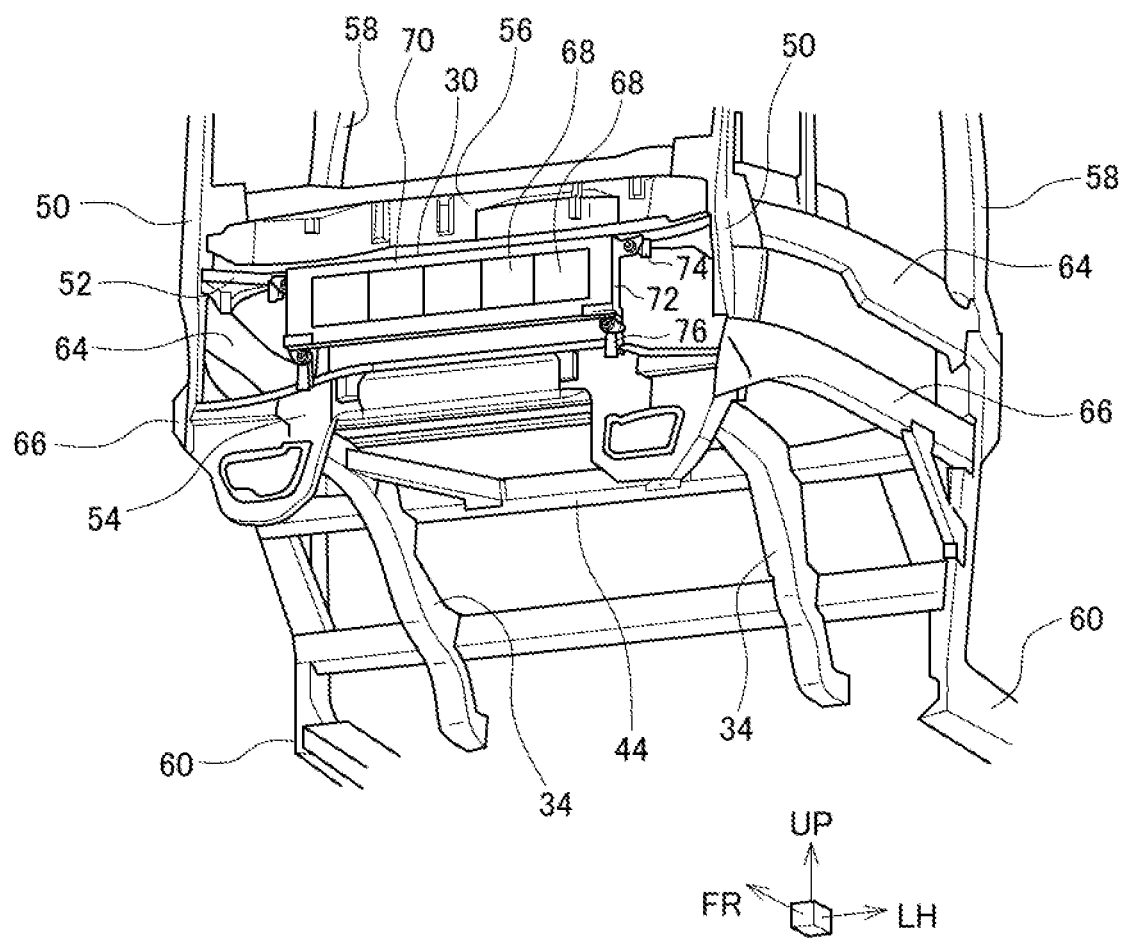
FIG. 4 is a perspective view of the frame structure of a front body.
Figure 5:
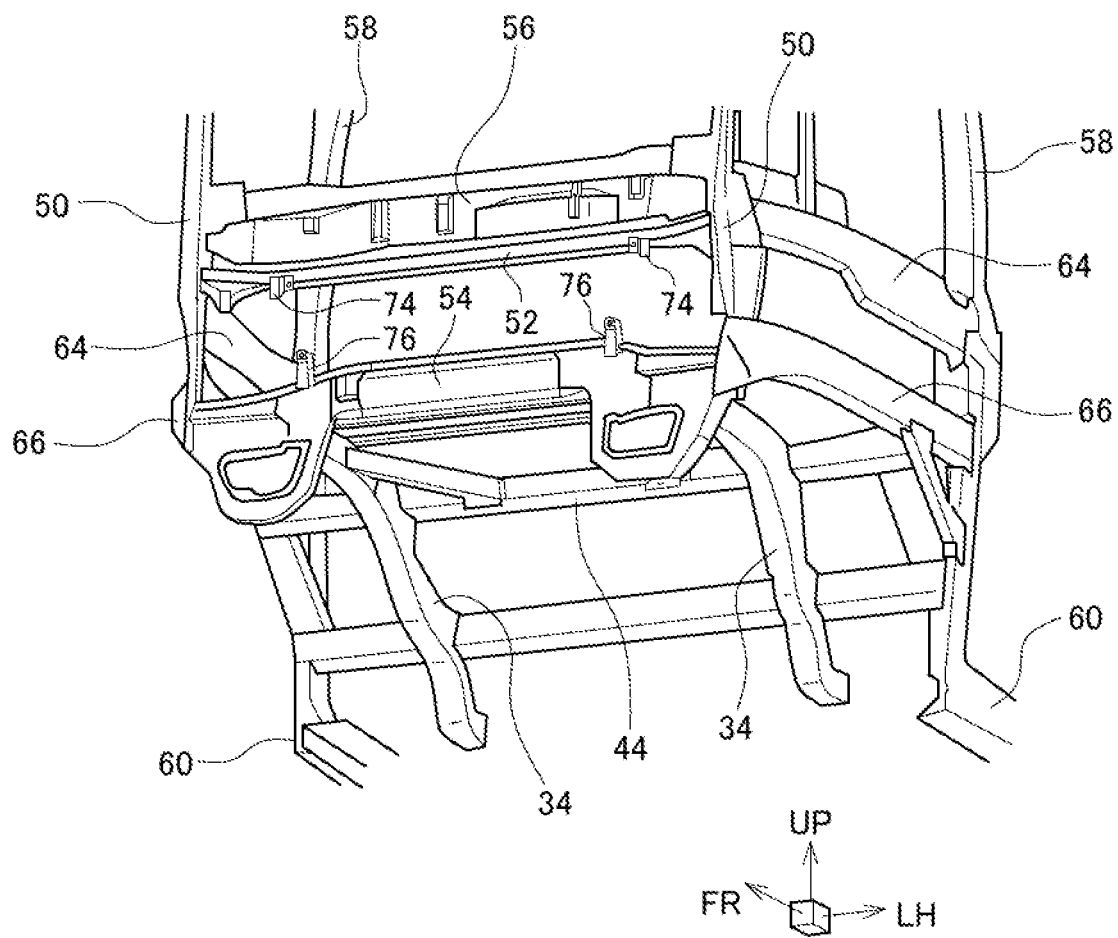
FIG. 5 is a perspective view of the frame structure of the front body from which an external display is removed.

FIGS. 4 and 5 each illustrate the frame structure of the front portion of the body 14 viewed from slightly below in front. FIG. 4 illustrates a state resulting from attachment of the external display 30. FIG. 5 illustrates a state resulting from removal of the external display 30. Front pillars 50 extending along the vertical direction are disposed one-to-one on the left and right of the front face of the body 14. An upper front crossing member 52 and a lower front crossing member 54 are provided such that the left and right front pillars 50 are linked together. The lower front crossing member 54 is disposed below the upper front crossing member 52. The lower front crossing member 54 extends along the lateral direction and has respective ends coupled one-to-one with the lower end portions of the front pillars 50. Each of the front side members 34 described above has a front end coupled with the lower front crossing member 54. The upper front crossing member 52 extends along the lateral direction and has respective ends that are located higher than the lower front crossing member 54 and are coupled one-to-one with the front pillars 50. A cowl panel 56 is disposed above the upper front crossing member 52. The cowl panel 56 has respective ends coupled one-to-one with the left and right front pillars 50.

The body 14 has each side face on which a second pillar 58 is disposed near the boundary between the driver's cab 16 and the passenger cabin 20. The second pillars 58 stand one-to-one on rockers 60 extending along the longitudinal direction, one-to-one, on the left and right of the passenger-cabin floor 24. The left front pillar 50 and second pillar 58 have respective upper ends coupled with a roof rail (not illustrated) extending along the longitudinal direction on the left of a roof 62 (refer to FIGS. 1 and 2) and support the roof 62 through the roof rail. The right front pillar 50 and second pillar 58 have respective upper ends coupled with a roof rail (not illustrated) extending along the longitudinal direction on the right of the roof 62 and support the roof 62 through the roof rail. The body 14 has each side face on which an upper side wall member 64 and a lower side wall member 66 are disposed such that the front pillar 50 and the second pillar 58 are linked together. The lower side wall member 66 is coupled with the lower end portion of the front pillar 50. The external display 30 is coupled, on its left and right, with the upper front crossing member 52 and the lower front crossing member 54.

Figure 6:
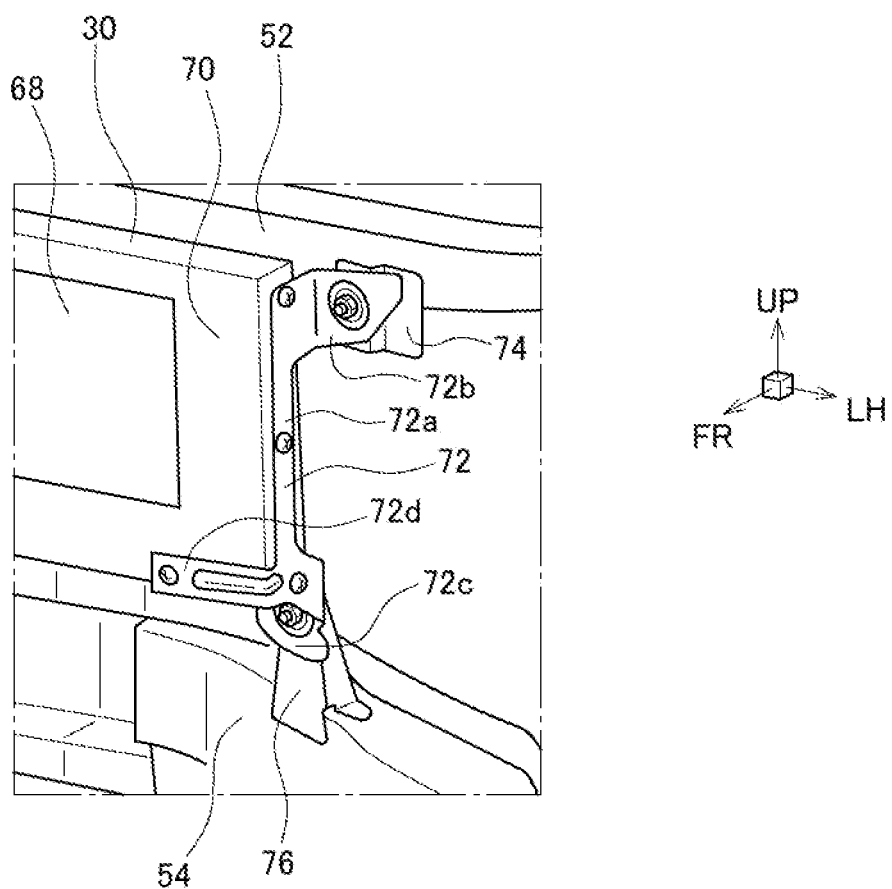
FIG. 6 is a perspective view of a minute fixation structure for the external display.

FIG. 6 illustrates the coupled part between the external display 30 and the upper and lower front crossing members 52 and 54, particularly, a minute coupled part on the left side.

The external display 30 includes a display panel 68 that performs displaying with a light-emitting element, such as an LED, and a display case 70 supporting the display panel 68. The display case 70 is a rectangular parallelepiped, particularly, a flat rectangular parallelepiped, having a face provided with an opening. The display panel 68 is disposed such that the opening is occluded, resulting in being boxy as a whole. The display case 70 houses a display drive device (not illustrated) that drives the display panel. The display case 70 may be made of steel. The external display 30 further includes display brackets 72 fixed one-to-one to the left and right side faces of the display case 70 by a technique, such as screw fixation. Each of the display brackets 72 includes a trunk 72a that extends along the corresponding side face of the display case 70 and is fixed to the corresponding side face, an upper leg 72b extending from the upper end portion of the trunk 72a in a direction away from the display case 70, and a lower leg 72c provided round to the rear face of the display case 70 from the lower end portion of the trunk 72a. Each of the display brackets 72 further includes a front arm 72d extending, from the lower end portion of the trunk 72a, round to the front face of the display case 70. The front arm 72d is located opposite the front face and is fixed to the display case 70 at the front face.

The upper front crossing member 52 is provided with upper fixation bases 74 for fixing the external display 30 (refer to FIG. 5). The lower front crossing member 54 is provided with lower fixation bases 76 for fixing the external display 30 (refer to FIG. 5). Each of the upper fixation bases 74 has the upper leg 72b of the corresponding display bracket 72 fixed thereto with fastening members, such as a bolt and a nut. Each of the lower fixation bases 76 has the lower leg 72c of the corresponding display bracket 72 fixed thereto with fastening members, such as a bolt and a nut. Each of the lower legs 72c is located lower than the lower edge of the display case 70 such that fastening can be carried out from the front.

Due to fixation of the external display 30 to the upper and lower front crossing members 52 and 54, the external display 30 is used as a member that improves the strength of the frame members of the body, resulting in an improvement in the strength of a vehicular front structure.

The invention claimed is:

1. A vehicular front structure comprising:
   a left front pillar disposed at a left front face of a body of a vehicle;
   a right front pillar disposed at a right front face of the body;
   an upper front crossing member extending along a lateral direction of the vehicle, the upper front crossing member having respective ends coupled one-to-one with the left front pillar and the right front pillar;

a lower front crossing member extending along the lateral direction of the vehicle, the lower front crossing member having respective ends coupled one-to-one with the left front pillar and the right front pillar, the lower front crossing member being disposed below the upper front crossing member; and an external display coupled with the upper front crossing member and the lower front crossing member.

2. The vehicular front structure according to claim 1, wherein the external display has a left end edge and a right end edge coupled with the upper front crossing member and the lower front crossing member.

3. The vehicular front structure according to claim 2, wherein the external display includes:
   a display panel;
   a display case supporting the display panel, the display case housing a display drive device that drives the display panel;
   a left display bracket disposed along a left edge of the display case, the left display bracket being coupled with the left edge, the left display bracket having an upper end portion and a lower end portion coupled, respectively, with the upper front crossing member and the lower front crossing member; and
   a right display bracket disposed along a right edge of the display case, the right display bracket being coupled with the right edge, the right display bracket having an upper end portion and a lower end portion coupled, respectively, with the upper front crossing member and the lower front crossing member.

4. The vehicular front structure according to claim 3, wherein the display case is a rectangular parallelepiped having a face provided with an opening.

5. The vehicular front structure according to claim 4, wherein the display panel is disposed such that the opening is occluded.

6. The vehicular front structure according to claim 1, wherein the external display is fixed to the upper front crossing member and the lower front crossing member.

7. The vehicular front structure according to claim 1, wherein:
   the left front pillar is disposed at a left front face of a body of a vehicle extending along a vertical direction of the vehicle from a cowl panel to the lower front crossing member; and
   the right front pillar is disposed at a right front face of the body extending along the vertical direction of the vehicle from the cowl panel to the lower front crossing member.

8. The vehicular front structure according to claim 1, further comprising:
   a right upper fixation base fixed to the upper front crossing member;
   a left upper fixation base fixed to the upper front crossing member, the left upper fixation base fixed at a location sufficient distance from the right upper fixation base to accommodate a lateral length of the external display and permit simultaneous fixation of the external display to the upper front crossing member at the right upper fixation base and left upper fixation base;
   a right lower fixation base fixed to the lower front crossing member; and
   a left lower fixation base fixed to the lower front crossing member, the left lower fixation base fixed at a location sufficient distance from the right lower fixation base to accommodate the lateral length of the external display and permit simultaneous fixation of the external display to the lower front crossing member at the right lower fixation base and left lower fixation base.

9. The vehicular front structure according to claim 8, further comprising:
   a left trunk extending along and fixed to a left side face of the display case;
   a left upper end portion and a left lower end portion coupled, respectively, with the upper front crossing member and lower front crossing member;
   a left upper leg extending from the left upper end portion of the left trunk in a direction away from the display case;
   a left lower leg extending from the left lower end portion of the left trunk in a direction away from the display case;
   a left front arm fixed to a left front face of the display case and extending from the lower end portion of the left trunk to a front of the display case;
   a right trunk extending along and fixed to a right side face of the display case;
   a right upper end portion and a right lower end portion coupled, respectively, with the upper front crossing member and lower front crossing member;
   a right upper leg extending from the right upper end portion of the right trunk in a direction away from the display case;
   a right lower leg extending from the right lower end portion of the right trunk in a direction away from the display case; and
   a right front arm fixed to a right front face of the display case and extending from the lower end portion of the right trunk to the front of the display case.

10. The vehicular front structure according to claim 9, wherein the left lower leg of the display bracket and the right lower leg of the display bracket are located lower than the lower edge of the display case.

11. A vehicular front structure comprising:
   a left front pillar disposed at a left front face of a body of a vehicle;
   a right front pillar disposed at a right front face of the body;
   an upper front crossing member extending along a lateral direction of the vehicle, the upper front crossing member having respective ends coupled one-to-one with the left front pillar and the right front pillar;
   a lower front crossing member extending along the lateral direction of the vehicle, the lower front crossing member having respective ends coupled one-to-one with the left front pillar and the right front pillar, the lower front crossing member being disposed below the upper front crossing member; and
   an external display coupled with the upper front crossing member and the lower front crossing member, the external display comprising:
      a display panel;
      a display case supporting the display panel, the display case housing a display drive device that drives the display panel;
      a left display bracket disposed along a left edge of the display case, the left display bracket including:
         a left trunk fixed to a left side face of the display case;
         a left upper end portion and a left lower end portion coupled, respectively, with the upper front crossing member and lower front crossing member;
         a left upper leg of the display bracket fixed to the left upper fixation base;

a left lower leg of the display bracket fixed to the left lower fixation base; and a left front arm fixed to the display case; and a right display bracket disposed along a right edge of the display case, the right display bracket including:

a right trunk fixed to a right side face of the display case;

a right upper end portion and a right lower end portion coupled, respectively, with the upper front crossing member and lower front crossing member;

a right upper leg of the display bracket fixed to the right upper fixation base;

a right lower leg of the display bracket fixed to the right lower fixation base; and a right front arm fixed to the display case.

12. The vehicular front structure of claim 11, further comprising a sensor unit provided on the front of the vehicle.

13. The vehicular front structure of claim 12, wherein the sensor unit includes a light detection and ranging device.

14. The vehicular front structure of claim 12, wherein the sensor unit is located below the external display.

* * * * *